US012711943B2

(12) United States Patent
Bansal et al.

(10) Patent No.: US 12,711,943 B2
(45) Date of Patent: Aug. 18, 2026

(54) CODE-MIXED SPEECH ENGINE IN A SPEECH SYNTHESIS SYSTEM

(71) Applicant: Microsoft Technology Licensing, LLC, Redmond, WA (US)

(72) Inventors: Shubham Bansal, Telangana (IN); Arijit Mukherjee, Telangana (IN); Vikas Joshi, Karnataka (IN); Rupeshkumar Rasiklal Mehta, Telangana (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 250 days.

(21) Appl. No.: 18/482,605

(22) Filed: Oct. 6, 2023

(65) Prior Publication Data

US 2025/0118285 A1 Apr. 10, 2025

(51) Int. Cl.

*G10L 13/047* (2013.01)
*G10L 13/08* (2013.01)
*G10L 13/10* (2013.01)

(52) U.S. Cl.

CPC .......... *G10L 13/047* (2013.01); *G10L 13/086* (2013.01); *G10L 13/10* (2013.01); *G10L 2013/105* (2013.01)

(58) Field of Classification Search

CPC ..... G10L 13/047; G10L 13/086; G10L 13/10; G10L 2013/105

See application file for complete search history.

(56) References Cited

U.S. PATENT DOCUMENTS 12,080,271 B2 * 9/2024 Patel ........................ G06N 3/04
2022/0122581 A1 * 4/2022 Chen ..................... G10L 13/047

(Continued)

OTHER PUBLICATIONS

Sitarum and Black (Sunayana Sitaram and Alan W Black. 2016. Speech Synthesis of Code-Mixed Text. In Proceedings of the Tenth International Conference on Language Resources and Evaluation (LREC'16), pp. 3422-3428, Portoro, Slovenia. European Language Resources Association (ELRA)) (Year: 2016).*

(Continued)

*Primary Examiner* — Bhavesh M Mehta
*Assistant Examiner* — Joseph J. Yamamoto
(74) *Attorney, Agent, or Firm* — Shook, Hardy & Bacon L.L.P.

(57) ABSTRACT

Methods, systems, and computer storage media for providing speech synthesis using a code-mixed speech engine in a speech synthesis system. A code-mixed speech engine supports generating natural and intelligible speech in a target speaker voice—for code-mixed-text of two or more languages—based on a code-mixed speech model that supports both code-mixing and cross-locale voice transfer scenarios. In operation, code-mixed training data associated with a plurality of different languages is accessed. A code-mixed speech model—associated with a training engine and an inference engine that support generating code-mixed synthesized speech—is generated. The code-mixed speech model is deployed. A request being received for synthesized speech of a speech synthesis service. An instance of code-mixed synthesized speech is generated. The instance of code-mixed synthesized speech is generated using the code-mixed speech model. The instance of code-mixed synthesized speech is communicated for output on an interface associated with the speech synthesis service.

20 Claims, 14 Drawing Sheets

(56) References Cited

U.S. PATENT DOCUMENTS

| | | | | |
|---|---|---|---|---|
| 2023/0290345 | A1* | 9/2023 | Joshi | G06N 3/044 |
| 2024/0304175 | A1* | 9/2024 | Erdmann | G10L 13/047 |

OTHER PUBLICATIONS

Yi, Lu, and Man-Wai Mak. "Disentangled speaker embedding for robust speaker verification." ICASSP 2022-2022 IEEE International Conference on Acoustics, Speech and Signal Processing (ICASSP). IEEE, 2022. (Year: 2022).*

Yang, Shanming, et al. "Orthogonality loss: Learning discriminative representations for face recognition." IEEE Transactions on Circuits and Systems for Video Technology 31.6 (2021): 2301-2314. (Year: 2021).*

* cited by examiner

110D
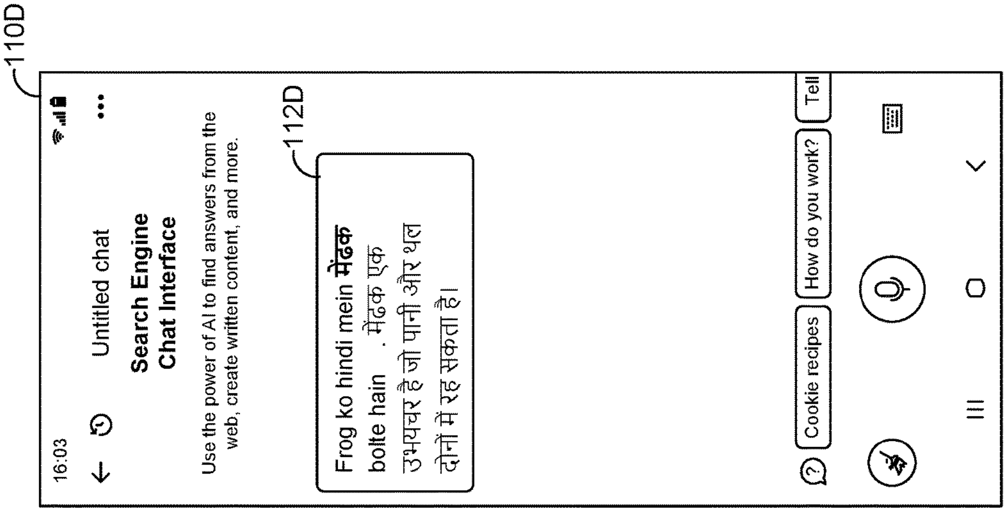
FIG. 1D
110E
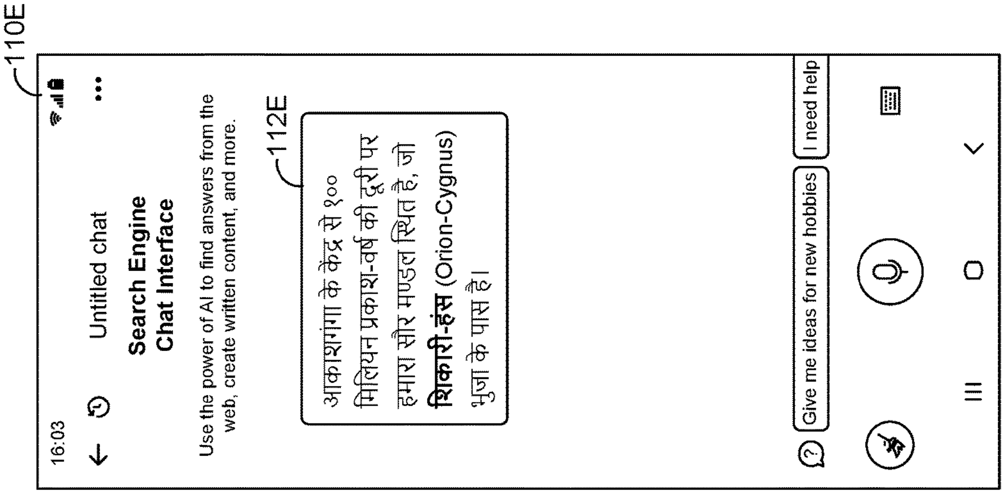
FIG. 1E
110F
| **Locale** | **CMOS** |
|---|---|
| Telugu | +0.018 |
| Tamil | +0.133 |
| Hindi | +0.260 |
| English | +0.006 |
FIG. 1F Input Sentence: Tussi இநத ja rahe ho? Tussi na jao. चलो जानेंगे आज का weather कैसा है

160H

| Test set | Code-mixed (Proposed vs Standard Approach) |
|---|---|
| En-Hi codemixed | +0.415 |

140I

| Phone Seq | en-in_t | en-in_u | / | ta-in_eh | ta-in_d | ... | hi-in_sh | ... |
|---|---|---|---|---|---|---|---|---|
| Locale ID | 28 | 28 | 28 | 49 | 49 | ... | 29 | ... |
| Speaker ID | Sydney | Sydney | Sydney | Sydney | Sydney | ... | Sydney | ... |
| Prosody Feat | Nisha | Nisha | Nisha | swara | swara | ... | Swara | ... |
| Duration Scaling | 1.0 | 1.0 | 1.0 | 0.95 | 0.95 | ... | 1.1 | ... |

110I 120I 130I 140I 150I 160I

| Language | Sentence | Locale specific TTS model | En-IN TTS model (in Chat) | New experience |
|---|---|---|---|---|
| En-IN | Just let me know when you're ready. I'm looking forward to reading your article | | | |
| Hi-IN | अब शहनाज ने सिद्धार्थ के साथ अपनी फोटो शेयर की है। | | Does not readout anything | |
| Te-IN | వివరాలు అందజేయాలంటూ ప్రభుత్వానికి కోర్టు ఆదేశాలు జారీ చేసింది. | | Does not readout anything | |
| Ta-IN | கற்பித்தல் என்பது ஒருவருக்கு ஒரு செய்தியினை அவரது மனதில் நன்கு ஆழப்பதியுமாறு விளக்கிச் சொல்லுதல். | | Does not readout anything | |
| Gu-IN | દેશમાં કોરોનાનાં દર્દીઓની સંખ્યા ખૂબ ઝડપથી વધી રહી છે. | | Does not readout anything | |
| Hi,En Codemixed | famous dialogue from the movie anand: बाबूमोशाय, जिंदगी बड़ी होनी चाहिए, लंबी नहीं! | Not supported in any specific | (skips out Hindi words) | |
| >2 languages Codemixed | चलो जानेंगे आज का weather कैसा है. Now playing today's Telugu news: జనసమూహాలపై విధించిన ఆంక్షలను కూడా తొలగిస్తున్నట్లు ఆమె వెల్లడించారు. | | (skips out Hindi words) | |

170I

180I

Note that the speaker characteristics remain the same across language/ scripts

FIG. 11

CODE-MIXED SPEECH ENGINE IN A SPEECH SYNTHESIS SYSTEM

BACKGROUND

Users rely on computing environments with applications and services to accomplish computing tasks. Distributed computing systems host and support different types of applications and services in managed computing environments. In particular, computing environments can implement a speech synthesis system (e.g., a text-to-speech "TTS" system) that provides conversion of written text to spoken audio functionality and speech synthesis that allows computers and devices to generate human-like speech output. For example, a TTS system may take textual input and use various linguistic and acoustic models to produce audible speech that sounds natural and intelligible. A speech synthesis system may operate based on text analysis, linguistic processing, acoustic modeling, and waveform generation, and can be used in various applications and industries including voice assistants, search engines, translation systems, and navigation systems.

SUMMARY

Various aspects of the technology described herein are generally directed to systems, methods, and computer storage media for, among other things, providing speech synthesis using a code-mixed speech engine of a speech synthesis system. A code-mixed speech engine supports generating natural and intelligible speech in a target speaker voice for code-mixed text of two or more languages. In particular, code-mixed speech engine functionality can be provided as part of speech synthesis (or text-to-speech) operations using a single model (e.g., code-mixed speech model) that is trained to improve both code-mixing and cross-locale voice transfer scenarios in a target speaker voice. The code-mixed speech model is generated based on learning speaker embeddings and language embeddings to capture their specific features in a multi-speaker and multilingual setting, and the code-mixed speech model is further generated based on a training constraint (e.g., an orthogonality constraint) that prevents speaker embeddings from leaking accent information—that may degrade the naturalness of the speech when synthesizing speech in a foreign language with a target speaker voice.

The code-mixed speech engine operates to provide code-mixed speech synthesis functionality based on: generating a code-mixed speech model using a training engine associated with a training phase; and generating code-mixed synthesized speech using an inference engine associated with an inference phase. The training engine supports generating the code-mixed speech model using multiple languages and scripts and an orthogonal loss training constraint. The inference engine supports generating code-mixed synthesized speech using the code-mixed speech model and language-specific prosody features. Operationally, different types of speech synthesis applications can be integrated (e.g., via an Application Programming Interface "API") with code-mixed speech engine and code-mixed speech model for generating code-mixed speech synthesis.

Conventionally, speech synthesis systems are not configured with a comprehensive computing logic and infrastructure to effectively provide code-mixed speech synthesis for a speech synthesis system. For example, a search result in a search engine chat interface may include words or phrases in two or more languages; however, a speech synthesis system may exclusively and ineffectively generate speech output for only one of the two or more languages—making for a poor user experience. Such speech synthesis systems lack integration with code-mixed speech operations that improve the accuracy of generating natural and intelligible speech in a target speaker voice for code-mixed text of two or more languages.

A technical solution—to the limitations of conventional speech synthesis systems—can include the challenge of generating a code-mixed speech model to support multiple languages, multiple texts, and mixed texts scenarios; generating code-mixed synthesized speech with a single voice across multiple locales and corresponding text (e.g., same synthesized voice speaking uniformly across languages); and providing speech synthesis operations and interfaces via a code-mixed speech engine in a speech synthesis system. As such, the speech synthesis system can be improved based on code-mixed speech operations that operate to effectively determine and provide code-mixed speech synthesis for speech synthesis applications in a particular manner.

In operation, code-mixed training data associated with a plurality of different languages is accessed. A code-mixed speech model—associated with a training engine and an inference engine that support generating code-mixed synthesized speech—is generated. The code-mixed speech model is deployed. A request being received for synthesized speech associated with a speech synthesis service. An instance of code-mixed synthesized speech is generated. The instance of code-mixed synthesized speech is generated using the code-mixed speech model. The instance of code-mixed synthesized speech is communicated for output on an interface associated with the speech synthesis service.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein:

FIGS. 1C-1I are schematics associated with an exemplary speech synthesis system that includes an code-mixed speech engine, in accordance with aspects of the technology described herein;

DETAILED DESCRIPTION

Overview

Figure 1A:
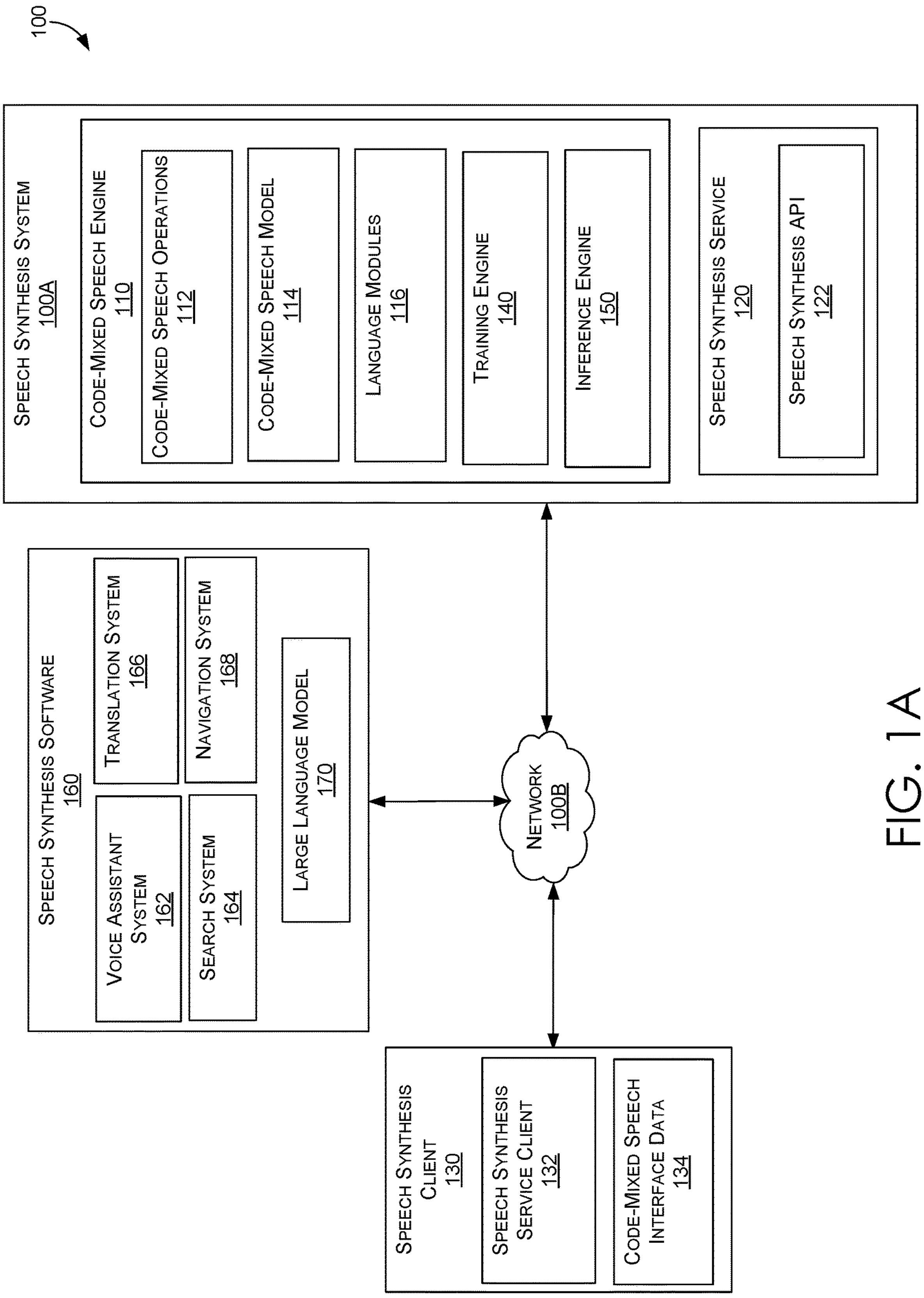
FIGS. 1A and 1B are block diagrams of an exemplary speech synthesis system that includes an code-mixed speech engine, in accordance with aspects of the technology described herein.

A speech synthesis system, also known as a text-to-speech (TTS) system supports converting written text into spoken audio. The speech synthesis system facilitates generating human-like speech that is natural, intelligible, and expressive. The speech synthesis system can integrate into applications or services to provide a spoken interface, making it easier for users to interact with and understand information presented. Speech synthesis systems find application in a wide range of fields and the synthesized speech aims to enhance user experiences in various contexts. For example, voice assistants, navigation systems, translation services, and interactive devices can have natural and audible ways to communicate information via a speech synthesis system. Speech synthesis systems continue to evolve with advancements in deep learning leading to more natural and expressive synthesized speech.

Conventionally, speech synthesis systems are not configured with a comprehensive computing logic and infrastructure to effectively provide code-mixed speech synthesis for a speech synthesis system. For example, a search result in a search engine chat interface may include words or phrases in two or more languages; however, a speech synthesis system may exclusively and effectively generate speech output for only one of the two or more languages—making for a poor user experience. Limitations in conventional speech synthesis systems can include accent leak—where a target speaker speaks a foreign language with an accent; and quality issues—where speech synthesis systems that are designed well only for a primary language with limited support for other languages. Such speech synthesis systems lack integration with code-mixed speech operations that improve the accuracy of generating natural and intelligible speech in a target speaker voice for code-mixed text of two or more languages.

Merely implementing a conventional speech synthesis system—without a code-mixed speech model—causes deficient functioning of the speech synthesis system. For example, a unilingual speech system can be inefficient in applications involving cross-cultural communication or education that can lead to misunderstandings and less effective communication. A conventional speech synthesis system may have to include multiple versions of applications or services, each tailored to a specific language which increases complexity of software development and maintenance. Some conventional speech synthesis systems may only enhance a main language and add support for secondary language with a single code-mixed speech model. Moreover, without a code-mixed speech model, a speech synthesis may produce unnatural or inaccurate speech, or omit words or phrases when confronted with mixed-language input leading to a poor user experience. As such, a more comprehensive speech synthesis system—with an alternative basis for performing speech synthesis system operations—can improve computing operations and interfaces for providing speech synthesis with code-mixed synthesized speech.

Embodiments of the present technical solution are directed to systems, methods, and computer storage media, for among other things, providing speech synthesis using a code-mixed speech engine of a speech synthesis system. A code-mixed speech engine supports generating natural and intelligible speech in a target speaker voice for code-mixed text of two or more languages. In particular, code-mixed speech engine functionality can be provided as part of speech synthesis (or text-to-speech) operations using a single model (e.g., code-mixed speech model) that is trained to improve both code-mixing and cross-locale voice transfer scenarios in a target speaker voice. The code-mixed speech model is generated based on learning speaker embeddings and language embeddings to capture their specific features in a multi-speaker and multi-lingual setting, and is further generated based on a training constraint (e.g., an orthogonality constraint) that prevents speaker embeddings from leaking accent information that may degrade the naturalness of the speech when synthesizing speech in a foreign language with a target speaker voice. Speech synthesis is provided using the code-mixed speech engine that is operationally integrated into the speech synthesis system. The speech synthesis system supports a code-mixed speech synthesis framework of computing components associated with generating a code-mixed speech model and providing code-mixed speech synthesis to support speech synthesis applications and services.

At a high level, code-mixed speech operations are provided to support generating code-mixed speech. Byway of context, code-mixing is a linguistic phenomenon that occurs when a speaker alternates between two or more language within a single utterance, sentence, or conversation. It is commonly observed in multi-lingual or bilingual communities where individuals are proficient in more than one language and naturally integrate elements of these languages in their speech. Speech synthesis applications or services (e.g., voice assistant systems, translations systems, navigation systems or search systems) can support understanding and responding in code-mixed text because of technological advances with large language models (LLMs). In particular, a voice assistant system may be able to understand and respond in multi-lingual or code-mixed text format. In this way, speech synthesis applications or services can be configured to support improved multi-lingual voice experiences—particularly for different types of bilingual and multi-lingual regions.

A speech synthesis system (or text-to-speech "TTS" system) operates to convert written text into spoken audio. A speech synthesis system includes a code-mixed speech engine to support generating a code-mixed speech model and employing the code-mixed speech model to generate code-mixed synthesized speech. Code-mixed synthesized speech can refer to natural speech for code-mixed text for two or more languages. The code-mixed synthesized speech can be generated using a single model (e.g., the code-mixed speech model) in a target speaker voice. The code-mixed speech engine provides code-mixed speech operations that include a training phase and an inference phase.

During the training phase, the code-mixed speech model is trained with multiple languages and scripts. In particular, the training phase employs orthogonal loss to reduce accent leakage when a target speaker speaks in a foreign language in code-mixed text. The orthogonal loss training constraint includes disentangling speaker embeddings from language embeddings. The speaker embeddings and language embeddings learn complimentary information by enforcing the orthogonality constraint, which results in orthogonal embedding spaces. In operation, for a batch size of N utterances, we obtain N speaker embeddings $\{S_i\}_{i=1 \ldots N}$ of d dimension each. A matrix S of dimension N*d whose rows are the normalized hidden layer representation speaker embeddings (each row has magnitude of 1) is generated as shown below:

$$S=[S_{1Norm}, S_{2Norm}, \ldots S_{NNorm}]^T$$

A matrix L of dimension N*d whose rows are the normalized hidden layer representation language embeddings (each row has magnitude of 1) is generated as shown below:

$$L=[L_{1Norm}, L_{2Norm}, \ldots L_{NNorm}]^T$$

A matrix define the frobenius norm (encourage orthogonality) $F_E$ of is generated as below:

$$F_E=\|SL^T\|^2$$

L2 regularization term $L2_E$ is defined to avoid learning the sparse Speaker and Language embedding representations.

Additional loss is defined as: $L_F=\alpha F_E+\beta L2_E$ where $\alpha$, $\beta$ are hyperparameters. The training may incorporate this additional loss during training along with other standard loss terms.

During the inference phase, a language identification model is employed to segment text by language. Then, a selected frontend (e.g., a language module) is applied to each segment to convert the code-mixed text to a code-mixed phone (phonemes) sequence. Code-mixed synthesized speech can be generated based on dynamically changing a reference speaker and language identifier (Locale ID) based on a phone identifier (phone ID). For example, if a language identifier is for Hindi, a Hindi speaker is used as the reference speaker and Hindi is the language identifier used to extract prosody features (e.g., rhythm, pitch, and intonation patterns of speech). In this way, a Hindi segment of a code-mixed synthesized speech sounds natural and similar to a native Hindi speaker, but with the target speaker's voice. In another example, for input text having a first text portion and a second text portion, the language identifier can be English for the first text portion and Hindi for the second text portion. An English speaker is used as a reference speaker for the first text portion and English is the language identifier used to extract prosody features, and a Hindi speaker is used as a reference speaker for the second portion and Hindi is the language ID used to extract prosody features. As such, the English segment and Hindi segment sound natural and similar in a target speaker's voice. Generating the code-mixed synthesized speech can also include employing pre-defined duration scaling to achieve uniform speech and transition in the code-mixed synthesized speech. In this way, the training engine, the code-mixed speech model, and the inference engine can be provided to support generating code-mixed synthesis speech for different applications.

Advantageously, the embodiments of the present technical solution include several inventive features (e.g., operations, systems, engines, and components) associated with a speech synthesis system having a code-mixed speech engine. The code-mixed speech engine supports code-mixed speech operations used to generate a code-mixed speech model—and providing speech synthesis system operations and interfaces via a code-mixed speech engine in a speech synthesis system. The code-mixed speech operations are a solution to a specific problem (e.g., limitations in generating comprehensive code-mixed synthesized speech) in a speech synthesis system. The code-mixed speech engine provides ordered combination of operations for generating a code-mixed speech model and generating code-mixed synthesized speech—using the code-mixed speech model—in a way that improves computing operations in a speech synthesis system. Moreover, the code-mixed synthesized speech is of high quality in multiple languages with a single target speaker voice that is generated in a particular manner that improves user interfaces of the speech synthesis system.

Example Systems and Operations

Figure 1B:
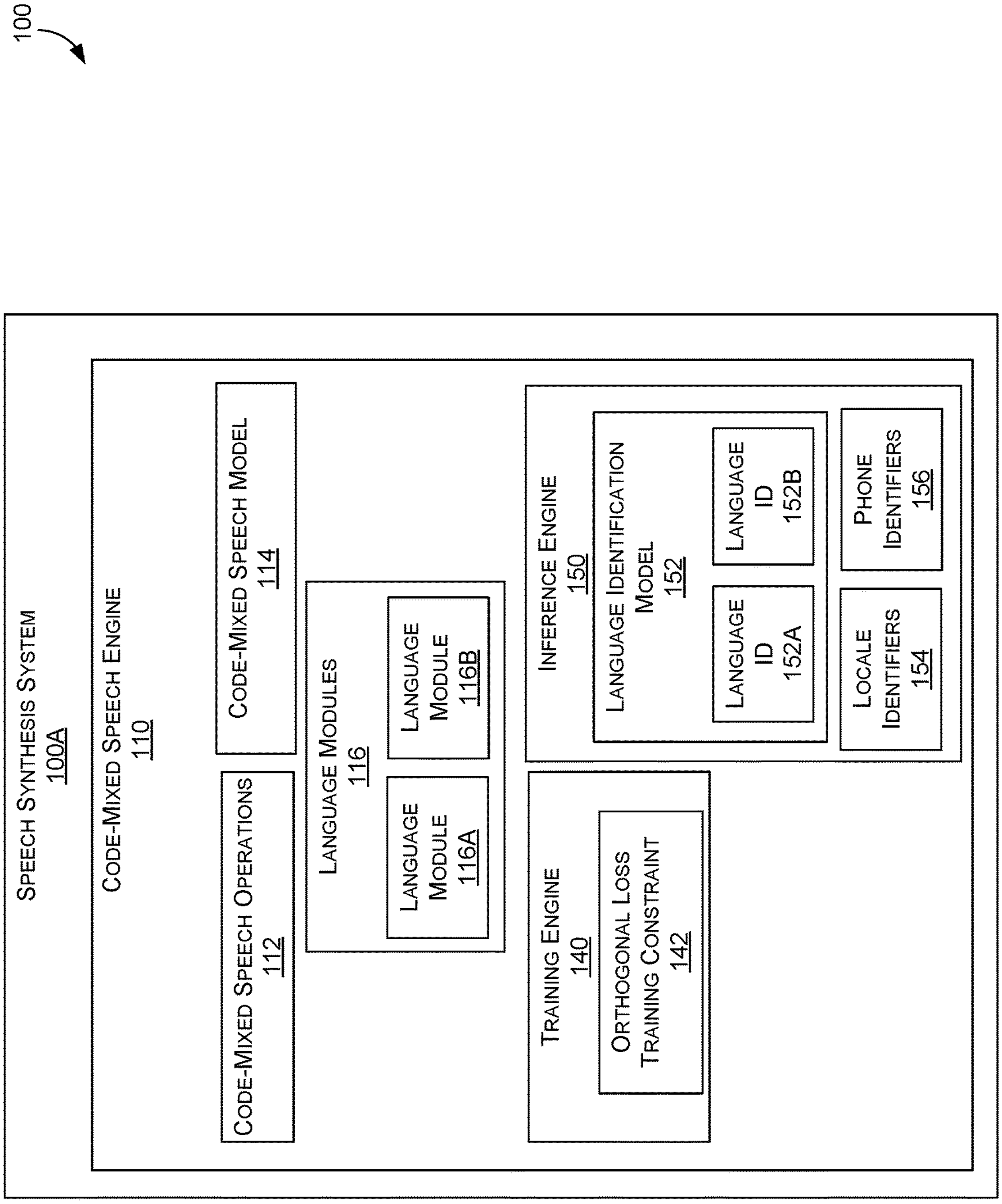

Aspects of the technical solution can be described by way of examples and with reference to FIGS. 1A-1B. FIG. 1A illustrates a cloud computing system (environment) 100 including speech synthesis system 100A; network 100B; code-mixed speech engine 110 having code-mixed speech operations 112, code-mixed speech model 114; language modules 116; speech synthesis client 130 with speech synthesis service client 132 and code-mixed speech interface data 134; and security synthesis service 120 with speech synthesis API 122; training engine 140; inference engine 150; and speech synthesis software 160 including voice assistant system 162, search system 164, translation system 166, navigation system 168; and large language model 170.

The cloud computing environment 100 provides computing system resources for different types of managed computing environments. For example, the cloud computing environment 100 supports delivery of computing services—including servers, storage, databases, networking, software synthesis applications and services collectively "service(s)", and speech synthesis system (e.g., speech synthesis system 100A). A plurality of speech synthesis clients (e.g., speech synthesis client 130) include hardware or software that access resources in the cloud computing environment 100. Speech synthesis client 130 can include an application or service that supports client-side functionality associated with cloud computing environment 100. The plurality of speech synthesis clients can access computing components of the cloud computing environment 100 via a network (e.g., network 100B) to perform computing operations.

Speech synthesis system 100A is responsible for providing code-mixed speech synthesis. Speech synthesis system 100A operates to convert written text into spoken audio. Speech synthesis system 100A can be integrated with components that support generating and outputting code-mixed synthesized speech. Speech synthesis system 100A provides an integrated operating environment based on a code-mixed speech synthesis framework of computing components associated with generating code-mixed speech model 114 and providing code-mixed speech synthesis to support speech synthesis applications and services (e.g., speech synthesis software 160). The speech synthesis system 100A integrates code-mixed speech operations 112—that support generating and implementing the code-mixed speech model 114—and provides speech synthesis system operations and interfaces to effectively provide code-mixed synthesized speech for applications and services. For example, speech synthesis software 160 can output code-mixed synthesized speech that is highly natural for code-mixed text for two or more languages—via a code-mixed speech model—in a target speaker voice.

The code-mixed speech engine 110 is responsible for providing code-mixed speech operations 112 that support the functionality associated with the code-mixed speech engine 110. The code-mixed speech operations 112 are executed to support training the code-mixed speech model 114 with features and functionality associated with language modules 116, training engine 140, and inference engine 150. The code-mixed speech engine 110 provides training engine 140 and an inference engine 150 that are employed for providing code-mixed synthesized speech.

The speech synthesis service 120 is responsible for communicating with speech synthesis client 130 having speech synthesis service 132 and the code-mixed speech interface data 134. The speech synthesis client 132 supports client-side code-mixed speech operations for providing code-mixed speech synthesis in the speech synthesis system. The speech synthesis client 132 support causing output of code-mixed synthesized speech via an interface associated with the speech synthesis service. As such, the code-mixed speech interface data 134 can include data associated with the code-mixed speech engine 110, data associated with the speech synthesis service 120, data associated with speech synthesis software 160 which can be communicated between the code-mixed speech engine 110, the speech synthesis service 120, the speech synthesis software 160 and the speech synthesis client 130.

The speech synthesis service 120 operates to facilitate providing functionality associated with the code-mixed speech engine 110. The speech synthesis service provides a speech synthesis API 122 that supports making requests to the code-mixed speech engine 110 to generate code-mixed synthesized speech. The speech synthesis service 120 operates to process input and communicate synthesized speech. For example, the speech synthesis software 160 can be integrated with speech synthesis service 120, code-mixed speech model 114, and inference engine to collectively enable generating code-mixed synthesized speech.

The speech synthesis software 160 can refer to speech synthesis applications or services (collectively "systems") that can support understanding and responding in code-mixed text. Different speech synthesis systems (e.g., voice assistance system 162, search system 164, translation system 166, and navigation system 168) can be configured to support multi-lingual voice experiences for bilingual and multi-lingual regions. Speech synthesis software 160 understands and responds to multi-lingual or mixed-script format. By way of illustration, a chat interface of a search system 164 (e.g., MICROSOFT BING) may mix English and Hindi (in Devanagari script) in a single response and the search system can support reading out both the Devangari script and the English script Large language model 170 can refer to a type of machine learning model. In particular, the large language model 170 is a statistical model that can be used predict the probability of a sequence of words of tokens in a natural language. The large language model 170 can support natural language understanding including text generation and machine translation. Large language models can support contextual responses, answering questions, content generation, language translation, text summarization, task automation, learning and assistance, and accessibility tools. For example, a chat interface for a search engine and other chat interfaces associated with Large Language Models (LLMs) can produce output in different languages with mixed script. While conventional speech synthesis software may face the challenge of having same speaker voice across language and script, the training phase techniques (e.g., orthogonality loss to reduce accent leak) and inference phase techniques (e.g., code-mixed inference pipeline) can be employed to reduce accent leak and generate code-mixed synthesized speech with a single speaker for multiple languages and scripts.

The speech synthesis client 130 can support accessing code-mixed synthesized speech and causing output of the code-mixed synthesized speech. The speech synthesis client 130 may operate with the speech synthesis software 160, the speech synthesis service 120, the code-mixed speech model 114, inference engine 150, or any combination thereof. It is contemplated that the code-mixed speech model 114 may be generated with integrated functionality of the inference engine 150, wherein the code-mixed speech 114 can be deployed on the speech synthesis client 130 or speech synthesis software 160 to operate with the inference engine functionality, as discussed herein. The speech synthesis client 130 can include the speech synthesis service client 132 that supports receiving the code-mixed speech interface data 134 from the speech synthesis system 100A and causing presentation of the code-mixed interface data 134. The code-mixed speech interface data 134 can specifically include code-mixed synthesized speech associated with the code-mixed speech model 114. The code-mixed speech interface data 134 can further include interface elements that highlight or distinguish different aspects of code-mixed synthesized speech. For example, the text associated with code-mixed synthesized speech can be illustrated in different scripts that are associated with corresponding portions of the code-mixed synthesized speech.

As such, code-mixed synthesized speech is generated based on the code-mixed speech engine 110 and provided via speech synthesis client 130 for speech synthesis software 160. The code-mixed synthesized speech is generated based on a code-mixed speech model 114 to support multiple languages, multiple texts, and mixed texts and the code-mixed synthesized speech is outputted in a single voice across multiple locales and corresponding text (e.g., same synthesized voice speaking uniformly across languages). It is contemplated that the code-mixed speech model can be generated and deployed a variety of ways to support providing code-mixed synthesized speech.

With reference to FIG. 1B, FIG. 1B illustrates the speech synthesis system 110A, code-mixed speech engine 110—having code-mixed speech operations 112, code-mixed speech model 114, language modules 116 including language module 116A and language module 116B; training engine 140 including orthogonal loss training constraint 142; and inference engine 150 language identification model 152, reference speakers 154, and phone identifiers 156.

The code-mixed speech model 114 supports multiple languages, multiple scripts, and mixed scripts. The code-mixed speech model 114 supports generating a single target speaker voice across different locales US-English, India-Hindu, and China-Chinese (e.g., en-US, hi-IN, zh-CN). In other words, the same voice artist speaks uniformly across all languages and scripts. As discussed, existing speech models may include accent leak, when the target speaker speaks a foreign language. Existing speech models may also have quality issues because the speech models are designed for a primary language and merely support additional languages.

The code-mixed speech engine 110 includes a training engine 140 and an inference engine 150 associated with providing a training phase and an inference phase, respectively, associated with generating code-mixed synthesized speech. The training phase includes orthogonality loss that reduces accent leak. For example, training the code-mixed speech model 114 with an orthogonality loss constraint (e.g., orthogonal loss training constraint 142) avoids accents from an en-US speaker modeled to speak hi_iN or another foreign language. Orthogonal loss-based training supports disentangling speaker embeddings and language embeddings. In existing approaches, speaker embeddings and language embeddings can be used to train an acoustic model. However, with no explicit loss, a target speaker embedding may tend to learn some accent information and hence affect foreign language speech. With this technical solution, the training phase includes speaker embeddings and language embeddings learning complementary information based on enforcing orthogonality constraint. The orthogonal loss results in orthogonal embedding spaces.

The orthogonal loss training constraint 142 can be performed algorithmically in that: For a batch size of N utterances, training includes obtaining N speaker embeddings representation $\{S_i\}_{i=1 \ldots N}$ of d dimensions each and N language embeddings representation $\{L_i\}_{i=1 \ldots N}$ of d dimensions each. A matrix S of dimension N*d whose rows are the normalized hidden layer representation of speaker embeddings (each row has magnitude of 1) is generated as shown: $S=[S_1, S_2, \ldots S_N]^T$. A matrix L of dimension N*d whose rows are the normalized hidden layer representation of language embeddings (each row has magnitude of 1) is generated as shown: $L=[L_1, L_2, \ldots L_N]^T$. The squared frobenius norm (encourage orthogonality) $F_E$ (added as an additional loss) is generated as shown: $F_E=\|SL^T\|^2$. L2 regularization to avoid learning sparse representations can also be added.

The inference phase—or code-mixing inference—includes dynamically selecting a corresponding locale identifier, the respective locale's speaker's prosody features and duration scaling depending on the phone in a code-mixed manner. By way of context, code-mixing inference can have a several challenges, for example, generating a correct pronunciation and generating the correct TTS or synthesized speech output for a given pronunciation. In particular, when multiple languages are supported, generating the pronunciation considering the right context is challenging, and even if the correct pronunciation is there, it is challenging for the acoustic model to generate the right spectrogram, the right prosody, and duration to make sound natural.

The inference phase—code-mixing inference solution—includes generating the correct pronunciation based on a language ID (LID) associated with language identification model 152. The LID (e.g., language ID 152A or language ID 152B) is used to determine a language of the word and further used to select a language frontend (e.g., language module 116A or language module 116B) which produces an appropriate phone sequence. For example, for a Tamil word, Tamil phones and pronunciation will be produced; and for English words, English phones and pronunciations will be produced. The code-mixing inference solution further includes generating the correct TTS output for a given pronunciation. The code-mixed speech model (e.g., a multi-lingual acoustic model) is employed to produce spectral representation for phones from all supported languages. In particular, to get an appropriate prosody, speed and duration, a corresponding locale ID is dynamically selected, such that, the respective locale's speaker's prosody features and duration scaling are implemented for uniform and highly natural code-mixed TTS experience.

By way of illustration, standard inference approach uses a single speaker from primary language as reference speaker to extract the prosodic feature for all the languages which may result in unnatural speech for secondary languages. Also, it is common to train secondary languages with same language ID as primary language to avoid training-inference mismatch. In inference phase of this technical solution, natural code-mixed synthesized speech can be generated for a pair or any number of languages using a single model. In operation, given a code-mixed input text and its corresponding phone sequence obtained with a language identification model (LID) and appropriate language module, e.g., "are: वाराणसी" and (1) en-in_a (2) en-in_r (3)/punc./(4) hi-in_vw (5) hi-in a; (6) hi-in_r; (7) hi-in_a—(8) hi-in_n (9) hi-in-ah (10) hi-in_s (11) hi-in_iy". A mapping can be made from each phone to a tuple of language ID, native reference speaker ID, and duration scale. It is contemplated that the duration scale can be implemented as a factor that adjusts the speed variation among the reference speakers to achieve consistent speech in the code-mixed synthesized speech output. For example, {"hi-in_r": (1, 480, 1.1), "hi-in a": (1, 480, 1.1), . . . "en-in_a": (2, 481, 0.9), "en-in_r": (2, 481, 0.9)}. For each phone in the phone sequence, the code-mixed speech model receives a corresponding language ID, reference speaker ID, and duration scale from the mapping. For phones that are shared across languages, such as punctuation or break phones, the same information as the preceding phone can be used in the sequence. A target speaker ID along with the updated input sequence can be used to generate code-mixed speech with high naturalness and intelligibility.

Figure 1C:
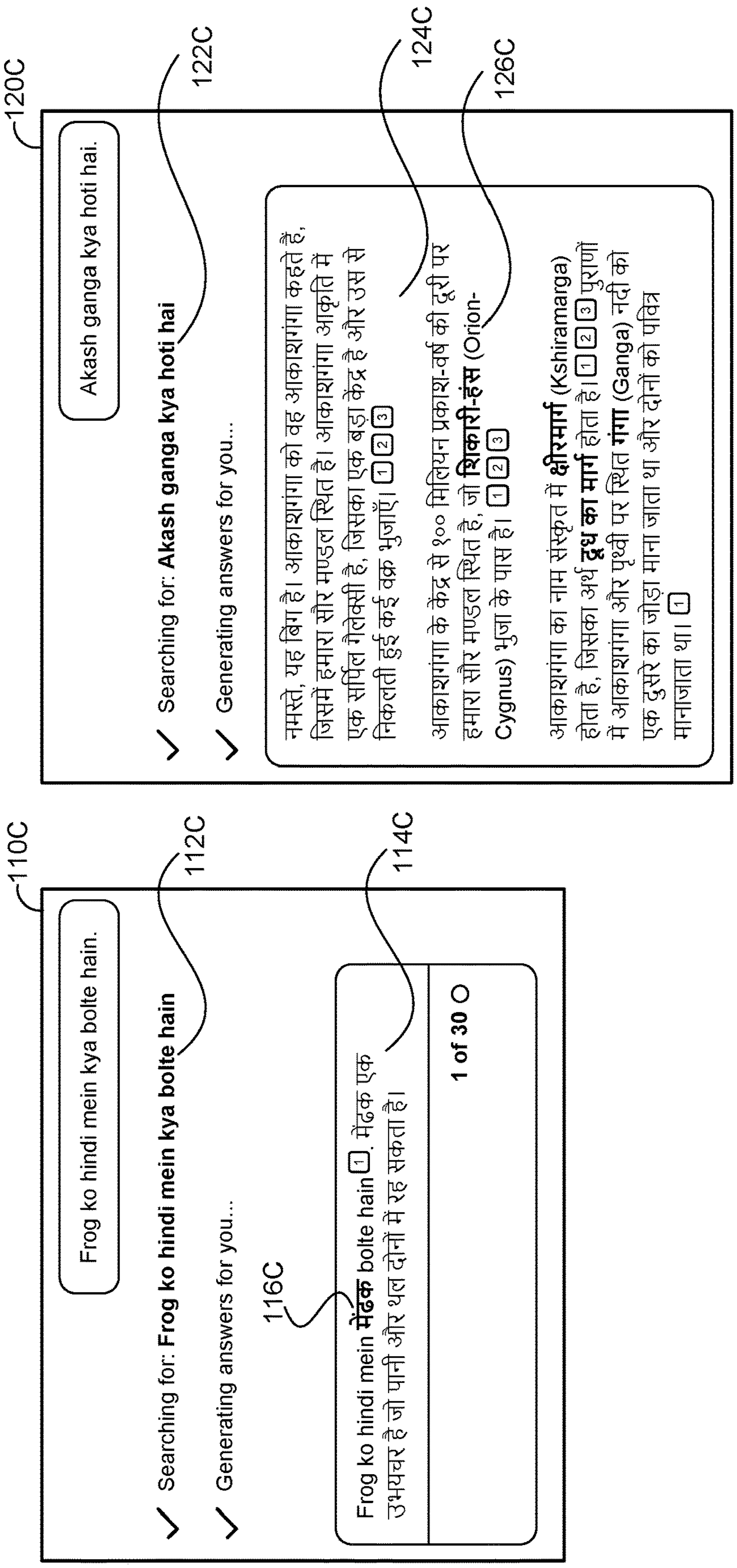

With reference to FIGS. 1C-1I, FIGS. 1C-1I illustrate schematics associated with the code-mixed speech engine 110 in the speech synthesis system 100A for providing code-mixed speech synthesis. FIG. 1C includes synthesized speech interface 110C and synthesized speech interface 120C. Synthesized speech interface 110C includes Hindi query 112C and Hindi and English response 114C. The Hindi and English response 114C is in mixed-script (e.g., Devanagari script and Roman script). For example, मेंढक 116C is in Devanagari script. In conventional speech synthesis systems, मेंढक 116C does not get generated as part of the audio output of the response. Making for a poor user experience as an entire word is omitted. Synthesized speech interface 120C includes a Hindi query 122C and a Hindi and English response 124C, where the Hindi and English response 124C is predominantly Hindi in Devanagari script and some English "Orion-Cygnus" 126C in Roman script. The Roman script text is generated as part of the audio output; however none of the Devanagari script is generated in the audio output. Synthesized speech interface 120C highlights another deficiency in conventional speech synthesis systems.

Turning to FIG. 1D, FIG. 1D illustrates search engine chat interface 110D and FIG. 1E illustrates search engine chat interface 110E. By way of example, a search engine system with a chat interface can be integrated with the code-mixed speech engine and code-mixed speech model of this technical solution, such that, the issues identified with respect to above-described scenarios are addressed. In particular, the English and Hindi response 112D and the English and Hindi response 112E (with predominantly Hindi script) will both be generated using a code-mixed speech model that supports multiple languages, multiple scripts, and mixed scripts such that the same voice artist reads the responses uniformly across all languages and scripts. The code-mixed speech model is trained where speaker embeddings and language embeddings learn complimentary information by enforcing an orthogonality constraint. As shown in FIG. 1F, a CMOS (Comparative Mean Opinion Score) chart 110F illustrates improvement in other locales "Tamil" and "Hindi" without regression in English for a single target speaker voice and a single code-mixed speech model.

Figure 1G:
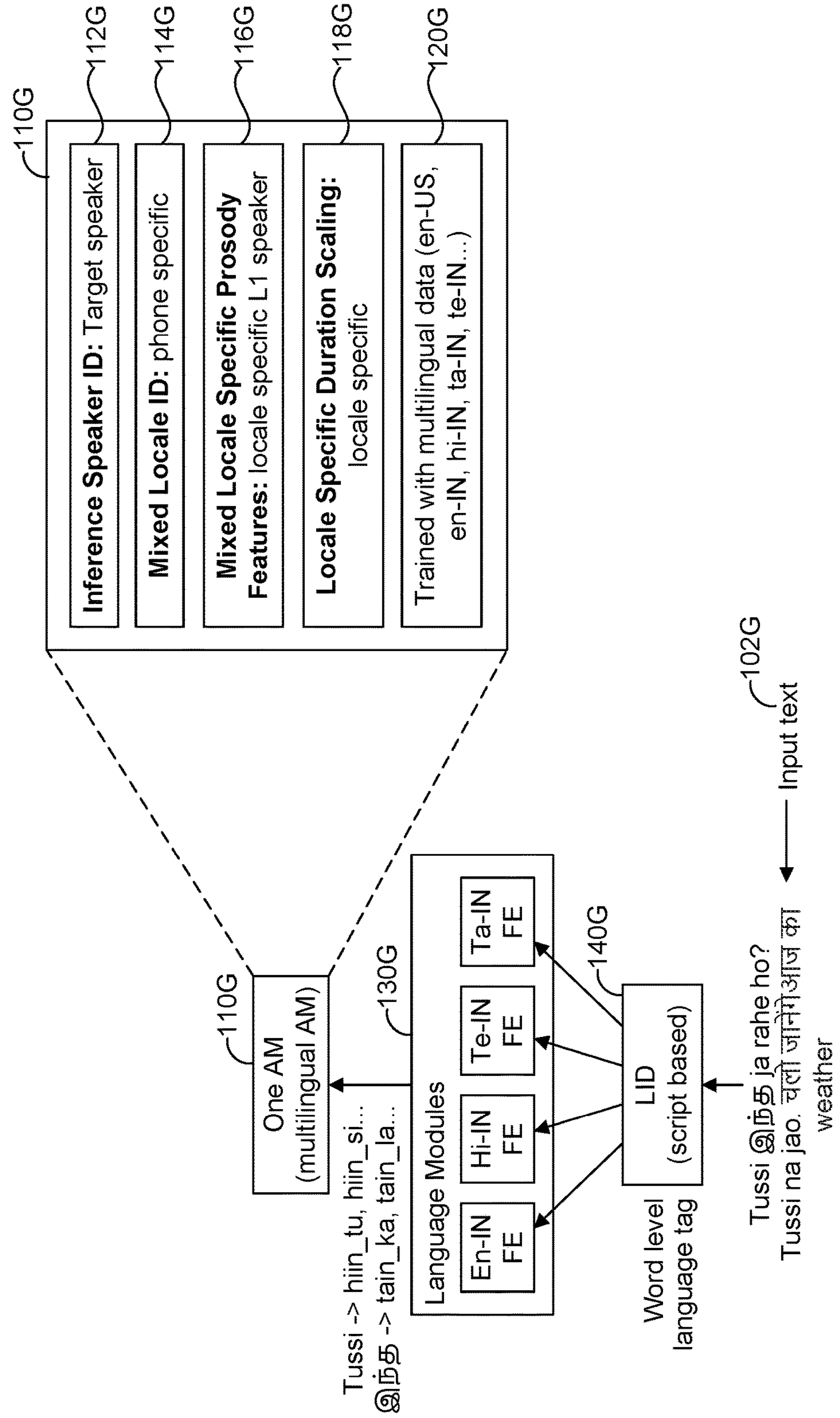

With reference to FIG. 1G, FIG. 1G illustrates an example representation of the speech synthesis system with a code-mixed speech model (e.g., one acoustic model "AM"—a multilingual AM) 110G that supports an inference speaker ID that identifies a target speaker 112G; a mixed local ID that identifies a locale of a phone 114G, mixed local specific prosody features associated with a local specific L1 speaker 116G and a location specific duration scaling that is locale specific 118G. The code-mixed speech model is trained with multilingual data 120G. By way of illustration, input text 102G is received. The input text can include text from two or more languages (e.g., Hindi and English) and further include two different scripts (e.g., Devanagari script and Roman script). An inference engine 140G can include a language identification model that identifies a language associated with each word in the input text and tags each word with a corresponding language (e.g., language identifier—LID). Language modules 130G can support a plurality of different language modules (e.g., English and Hindi) or frontends, where a language module is selected for each segment (e.g., word) to convert the segment to a code-mixed phone sequence. The code-mixed phone sequence is communicated to the code-mixed speech model 110G to generate the code-mixed synthesized speech. For example, if a language ID is for Hindi, a Hindi speaker is used as the reference speaker and Hindi is the language ID used to extract prosody features (e.g., rhythm, pitch, and intonation patterns of speech). In this way, a Hindi segment of a code-mixed synthesized speech sounds natural and similar to a native Hindi speaker, but with the target speaker's voice. Generating the code-mixed synthesized speech can also include employing pre-defined duration scaling to achieve uniform speech and transition in the code-mixed synthesized speech. In this way, the training engine, the code-mixed speech model, and the inference engine can be provided to support generating code-mixed synthesis speech for different applications.

Figure 1H:
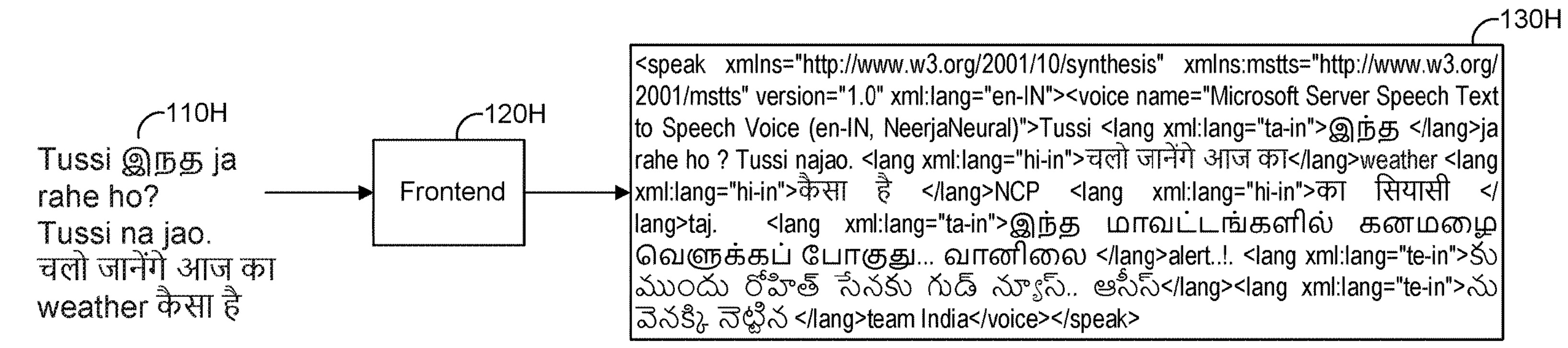
Figure 1H:
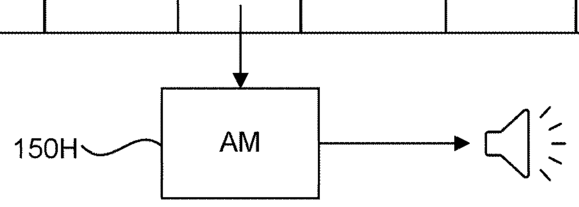

With reference to FIG. 1H, FIG. 1H illustrates another example implementation of the code-mixed speech engine. In particular, input text 110H is processed via frontend 120H. In particular, a markup language can be used as a text encoding format for code-mixed speech synthesis attributes for generating code-mixed synthesized speech. The code-mixed speech synthesis attributes can include the inference speaker ID: target speaker; mixed local ID: phone specific; mixed locale specific prosody features: locale specific L1 speaker; and local specific duration scaling: local specific. As shown, code-mixed speech synthesis text encoding 130H can be provided in a markup language and process via the code-mixed speech model to generate code-mixed synthesized speech. An example table representation 140I of the code-mixed speech synthesis attributes phone seq, locale ID, speaker ID, prosody feature, and duration scaling is provided for an input text 110J. The input text 110H can be processed via the code-mixed speech model to generate code-mixed synthesized speech that is output through audio module 150H (AM). As shown in table 160H, a CMOS (Comparative Mean Opinion Score) chart illustrates improvement in code-mixed English and Hindu synthesized speech compared to a standard approach.

With reference to FIG. 1I, FIG. 1I illustrates a comparison table 110I associated with the code-mixed speech engine. The comparison table 110I is associated with improved results and user experience based on the code-mixed speech engine technical solution compared to conventional synthesized speech and experiences. The comparison table 110I includes the language 120I, sentence 130I, local specific TTS model 140I, En-In TTS model in chat 150I, and new experience 160I. As discussed for conventional TTS models, by way of example, a search result in a search engine chat interface may include words or phrases in two or more languages; however, a speech synthesis system may exclusively and ineffectively generate speech output for only one of the two or more languages—making for a poor user experience. Limitations in conventional speech synthesis systems can be include accent leak—where a target speaker speak a foreign language with an accent; and quality issues—where speech synthesis systems that are designed well only for a primary language with limited support for other languages. The code-mixed speech operations of the code-mixed speech engine improve the accuracy of generating natural and intelligible speech in a target speaker voice for code-mixed text of two or more languages. Moreover, the speaker characteristics remain the same across language and scripts.

By way of illustration, a code-mixed synthesized speech output 170I can be generated based on an input sentence that includes words in Hindi and English for a target speaker. A language identification model is used to identify Hindi and English as languages associated with portions of texts in the input sentence. The portions of text are given language identifiers (LID). The portions of text are further processed to convert the portions of texts to phones with phone identifiers. Based on the language identifier and phone identifier, a portion of the code-mixed speech is generated. For example, when the language identifier for Hindi for a phone with a first phone ID, a Hindi speaker is used as the reference speaker and Hindi is the language identifier used to extract prosody features; and when the language identifier is for English for a phone a second phone ID, an English speaker is used as the reference speaker and English is the language identifier used to extract prosody features. In this way, a Hindi segment and an English segment of the code-mixed synthesized speech output 170I sounds natural and similar to a native Hindi speaker and English speaker, but with the target speaker's voice.

With reference to code-mixed synthesized speech output 180I, the code-mixed synthesized speech output 180I can be generated based on an input sentence that includes words in Telugu, Hindi, and English for a target speaker. After identifying the language identifiers and phone identifiers for phones in portions of texts, Telugu, Hindi, and English references can be identified for each language identifier and phone ID to extract corresponding prosody features the each language. As such, the Telugu segment, Hindi segment, and English segment of the code-mixed synthesized speech output 180I sound natural and similar to a native Telugu speaker, Hindi speaker, and English speaker in the target speaker's voice.

Figure 2A:
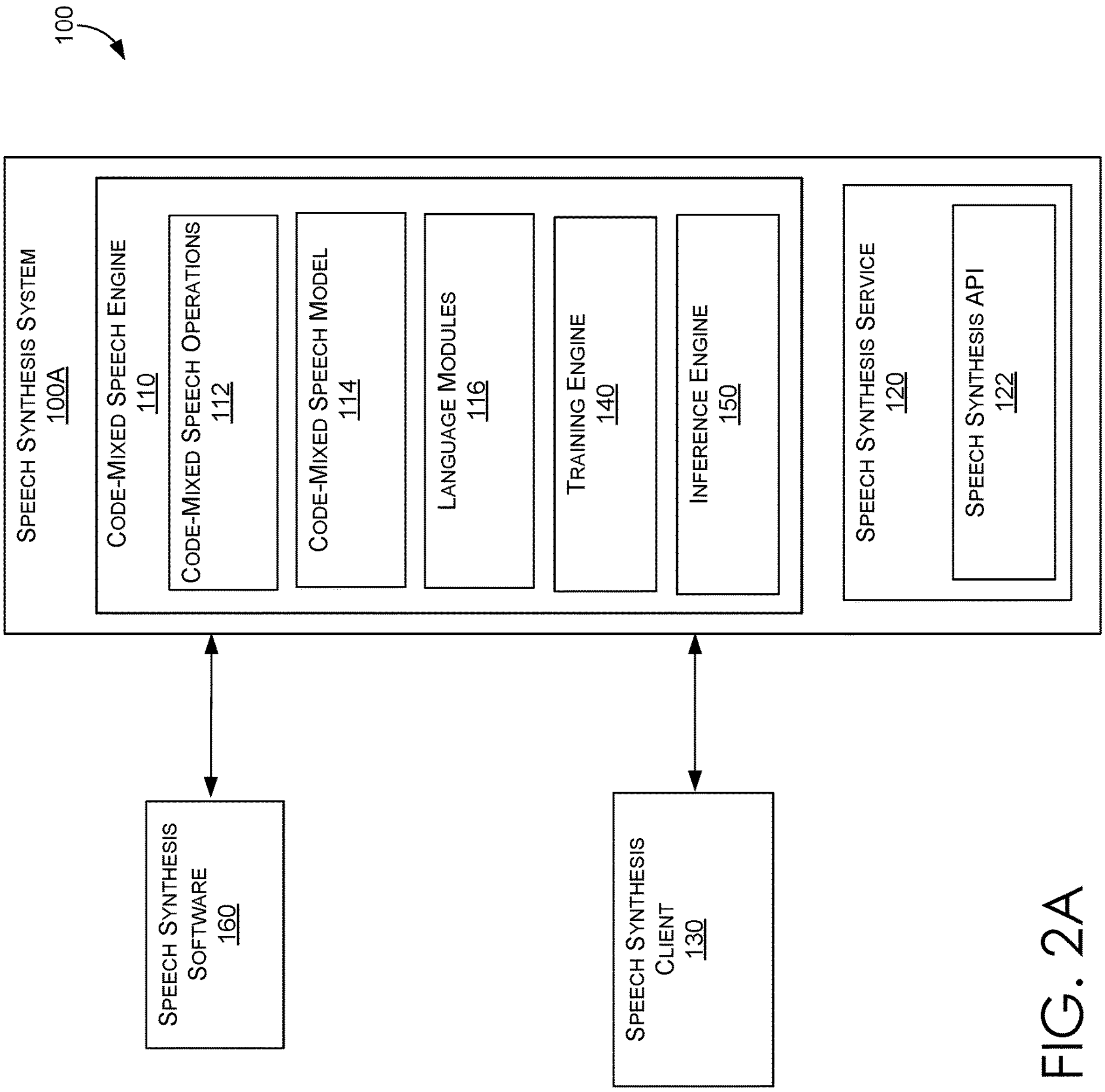
FIG. 2A is a block diagram of an exemplary speech synthesis system that includes an code-mixed speech engine, in accordance with aspects of the technology described herein.
Figure 2B:
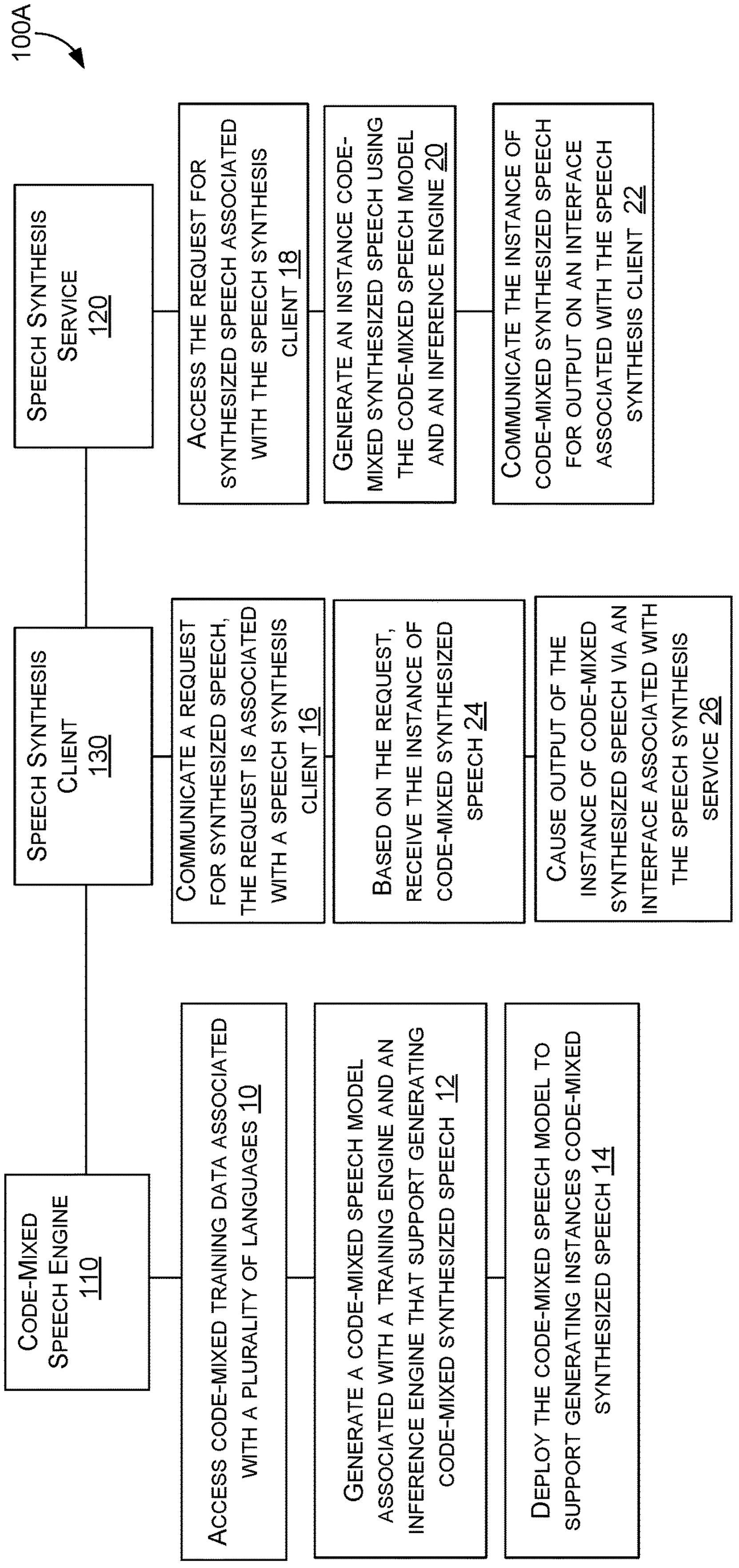
FIG. 2B is a block diagram of an exemplary speech synthesis system that includes an code-mixed speech engine, in accordance with aspects of the technology described herein.

Aspects of the technical solution can be described by way of examples and with reference to FIGS. 2A and 2B. FIG. 2A is a block diagram of an exemplary technical solution environment, based on example environments described with reference to FIGS. 6 and 7 for use in implementing embodiments of the technical solution are shown. Generally the technical solution environment includes a technical solution system suitable for providing the example speech synthesis system 100 in which methods of the present disclosure may be employed. In particular, FIG. 2A shows a high level architecture of the speech synthesis system 100A in accordance with implementations of the present disclosure. Among other engines, managers, generators, selectors, or components not shown (collectively referred to herein as "components"), the technical solution environment of speech synthesis system 100 corresponds to FIGS. 1A and 1B.

With reference to FIG. 2A, FIG. 2A illustrates a cloud computing environment 100 having speech synthesis system 100A, code-mixed speech engine 110 including code-mixed speech operations 112, code-mixed speech model 114, language models 116, training engine 140, inference engine 150; speech synthesis service 120 including speech synthesis API 122, speech synthesis client 130, and speech synthesis software 160.

The code-mixed speech engine 110 is responsible for generating a code-mixed speech model 114 that supports generating code-mixed synthesized speech. The code-mixed speech model is associated with a training engine (e.g., training engine 140) and an inference engine (e.g., inference engine 150) that support generating the code-mixed synthesized speech. The code-mixed speech engine 110 operates with a speech synthesis service (e.g., speech synthesis service 120) having a speech synthesis application programming interface (e.g., speech synthesis API 122) that is accessible to generate the code-mixed synthesized speech for a client (e.g., speech synthesis client 130) associated with speech synthesis software (e.g., speech synthesis software 160).

Operationally, the code-mixed speech engine 110 accesses code-mixed training data associated with a plurality of different languages. The code-mixed speech model 114 is generated based on training the code-mixed speech model 114 using code-mixed training data and the training engine 140. Training the code-mixed speech model 114 is generated based on speaker embeddings and language embeddings identified in the code-mixed training data. The training engine 140 supports an orthogonal training constraint that comprises disentangled speaker embeddings and language embeddings in training the code-mixed speech model to reduce accent leak of a target speaker. The code-mixed training data can further be associated with different scripts associated with the plurality of different languages.

The code-mixed speech engine 110 can deploy the code-mixed speech model that supports an inference engine 150 for generating code-mixed synthesized speech. It is contemplated that the code-mixed speech model may be deployed or integrated with inference engine 150 or operate with the inference engine 150 as a standalone engine. The code-mixed speech model 114 is deployed to support generating inferences using the inference engine 150, where the code-mixed speech model 114 is accessible via a speech synthesis service and an application programming interface. The speech synthesis service 120 can include an interface supports receiving a request and outputting an instance of code-mixed synthesized speech. The request comprises the code-mixed input including input text in two or more languages and the instance of the code-mixed synthesized speech is associated with output text in two or more languages.

The inference engine 150 dynamically selects a locale identifier and prosody features of a target speaker and executes duration scaling based on phones identified in the code-mixed input. In this way, generating the code-mixed synthesized speech can include using a language identification model to segment text of the code-mixed input into a first text of a first language and a second text of a second language. And then, selecting a first language module for the first text of the first language; selecting a second language model for the second text of the second language. The first language module and the second language module are used to generate a code-mixed phone sequence comprising a plurality of phones associated with the first text and the second text, where each code-mixed phone is associated with a phone identifier. The code-mixed synthesized speech is generated based on dynamically changing a reference speaker and language identifier based on a corresponding phone identifier. The reference speaker and the language identifier can be associated with prosody features that are employed for a target speaker's voice associated with the code-mixed synthesized speech.

The speech synthesis client 130 can operate to cause output of the code-mixed synthesized speech on an interface of the speech synthesis client. The speech synthesis client may operate with speech synthesis software for generating the code-mixed synthesized speech. The speech synthesis client can communicate a request for code-mixed synthesized speech, and based on the request, receive the code-mixed synthesized speech. It is contemplated that the code-mixed synthesized speech can be received in different formats and generated remotely or locally on the speech synthesis client 130. The code-mixed synthesized speech can be to be outputted on different types of interfaces of applications associated with speech synthesis.

In one embodiment, an indication can be communicated from the speech synthesis client 130 to update to a new target speaker (e.g., US-English to UK-English). The target speaker can be updated to a new target speaker. A second request for a second instance of code-mixed synthesized speech is communicated and based on the second request, the speech synthesis client 130 receives the second instance of code-mixed synthesized speech generated based on the new target speaker. The second instance of code-mixed synthesized speech is different from the instance of code-mixed synthesized speech and generated based on the new target speaker. The speech synthesis client 130 causes output of the second code-mixed synthesized speech on the interface.

With reference to FIG. 2B, FIG. 2B illustrates a speech synthesis system 100A having code-mixed speech engine 110, speech synthesis client 130, and speech synthesis service 120. At block 10, the code-mixed speech engine 110 accesses code-mixed training data associated with a plurality of different languages; at block 12, generates a code-mixed speech model associated with a training engine and an inference engine that support generating code-mixed synthesized speech; and at block 14, deploys the code-mixed speech model to support generating instances of code-mixed synthesized speech. At block 16, the speech synthesis client 130 communicates a request for the synthesized speech, the request being associated with a speech synthesis service.

At block 18, the speech synthesis service, accesses the request for synthesized speech associated with the speech synthesis client; at block 20, generates an instance of code-mixed synthesized speech using the code-mixed speech model and the inference engine; at block 22, communicate the instance of code-mixed synthesized speech for output on an interface associated with the speech synthesis client. At block 24, the speech synthesis client 130, based on the request, receives the instance of code-mixed synthesized speech; and at block 26, causes output of the instance of code-mixed synthesized speech via an interface associated with the speech synthesis client.

Example Methods

Figure 3:
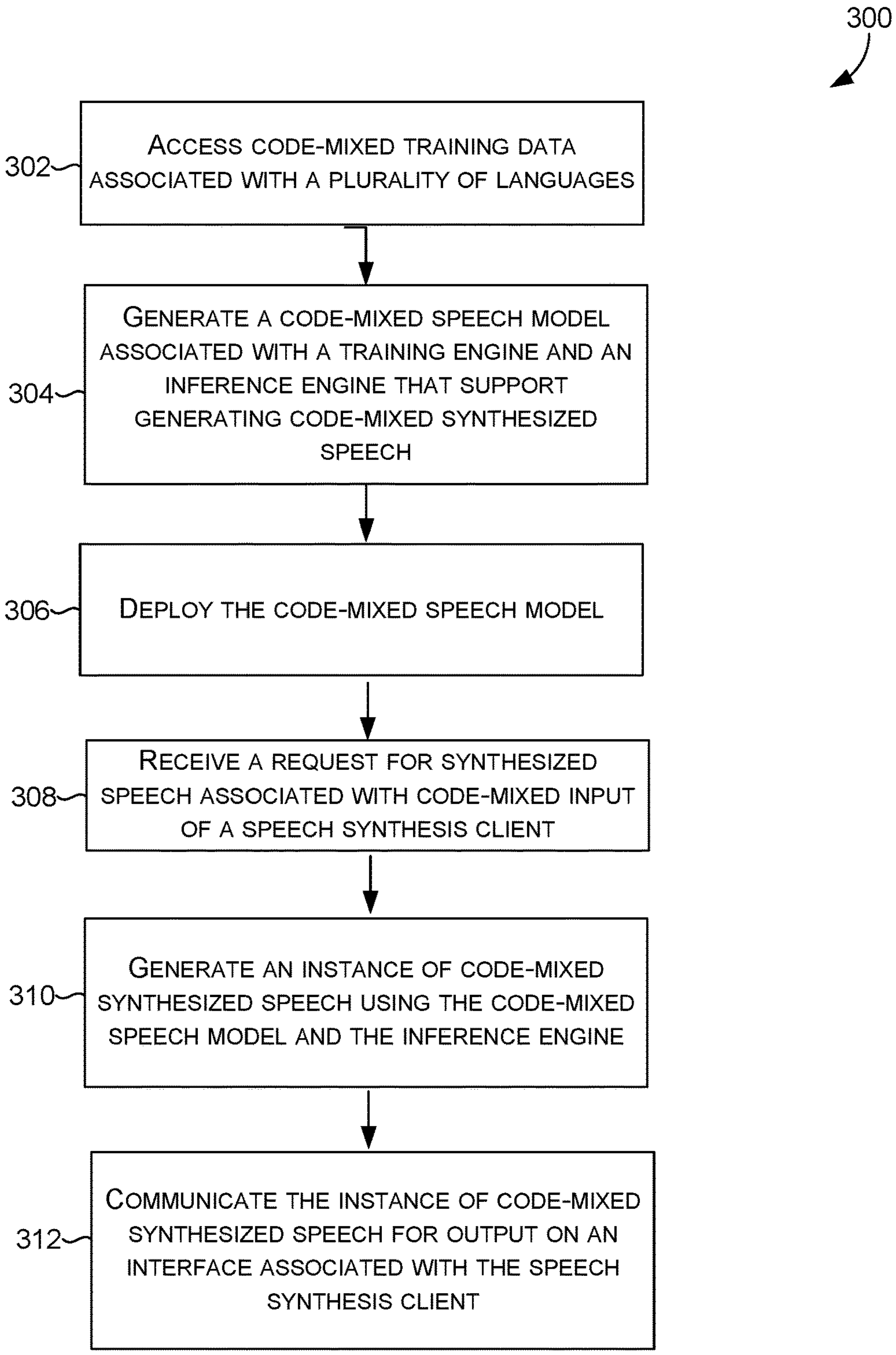
FIG. 3 provides a first exemplary method of providing speech synthesis using an code-mixed speech engine, in accordance with aspects of the technology described herein.
Figure 4:
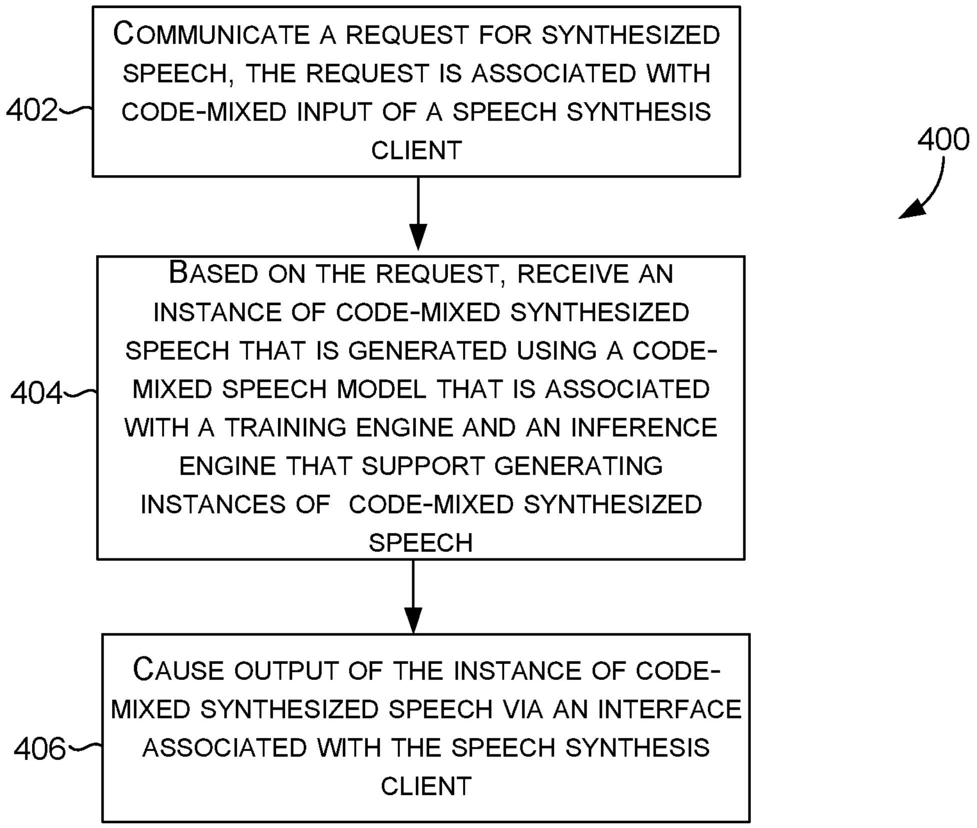
FIG. 4 provides a second exemplary method of providing speech synthesis using an code-mixed speech engine, in accordance with aspects of the technology described herein.
Figure 5:
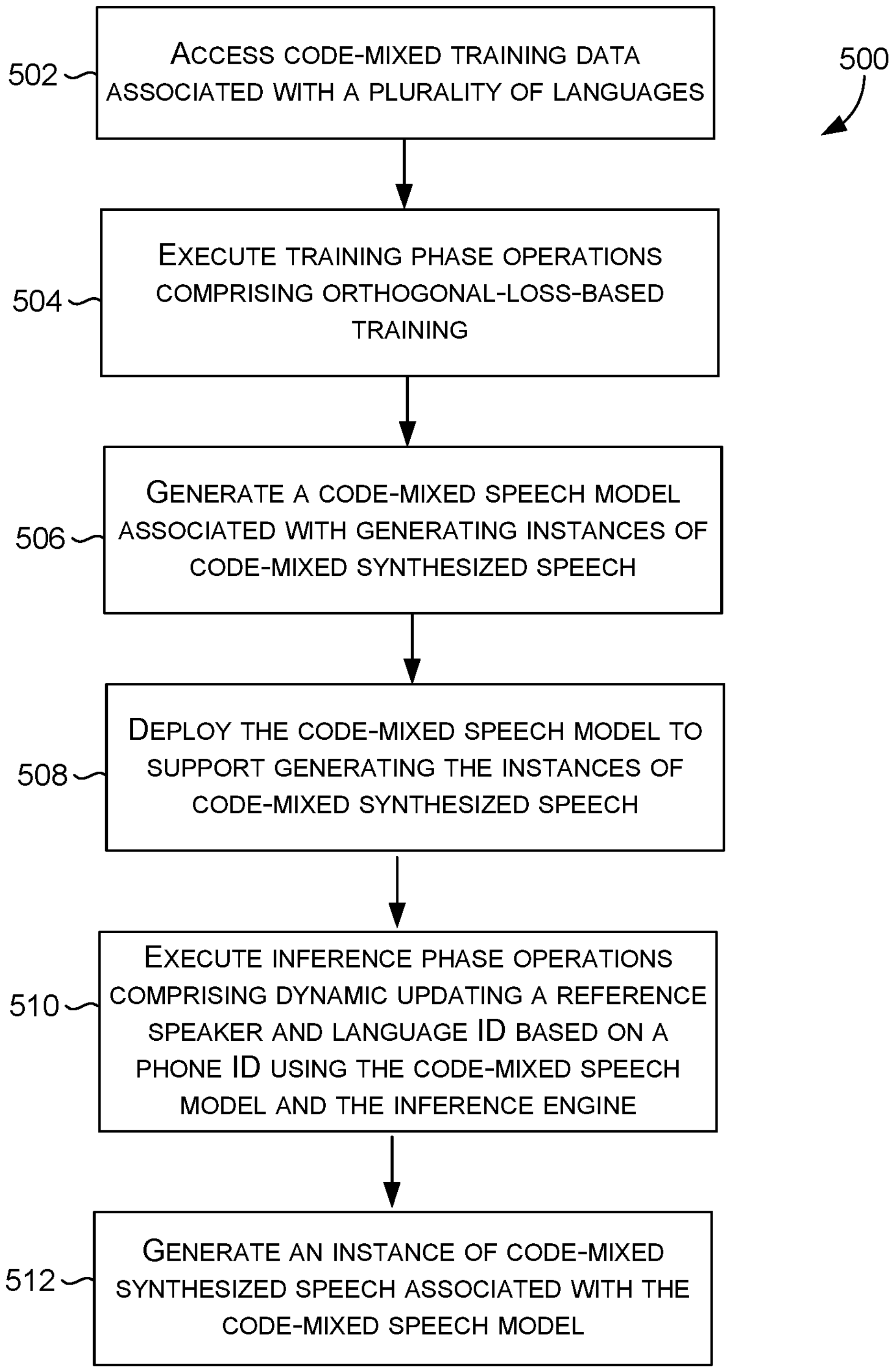
FIG. 5 provides a third exemplary method of providing speech synthesis using an code-mixed speech engine, in accordance with aspects of the technology described herein.

With reference to FIGS. 3, 4, and 5, flow diagrams are provided illustrating methods for providing speech synthesis using a code-mixed speech engine in a speech synthesis system. The methods may be performed using the speech synthesis system described herein. In embodiments, one or more computer-storage media having computer-executable or computer-useable instructions embodied thereon that, when executed, by one or more processors can cause the one or more processors to perform the methods (e.g., computer-implemented method) in the speech synthesis system (e.g., a computerized system or computing system).

Turning to FIG. 3, a flow diagram is provided that illustrates a method 300 for providing speech synthesis using an code-mixed speech engine in a speech synthesis system. At block 302, code-mixed training data associated with a plurality languages is accessed. At block 304, based on the code-mixed training data, a code-mixed speech model associated with a training engine and an inference engine that support generating code-mixed synthesized speech is generated. At block 306, the code-mixed speech model is deployed. At block 308, a request for synthesized speech is received, the request being associated with code-mixed input of a speech synthesis client. At block 310, using the code-mixed speech model and the inference engine, an instance of code-mixed synthesized speech is generated. At block 312, the instance of code-mixed synthesized speech is communicated for output on an interface associated with the speech synthesis client.

Turning to FIG. 4, a flow diagram is provided that illustrates a method 400 for providing speech synthesis using a code-mixed speech engine in a speech synthesis system. At block 402, a request for synthesized speech is communicated, the request being associated with a speech synthesis client. At block 404, based on the request, an instance of code-mixed synthesized speech that is generated using a code-mixed speech model that is associated with a training engine and an inference engine that support generating instances of code-mixed synthesized speech. At block 406, the instance of code-mixed synthesized speech is caused to be outputted via an interface associated with the speech synthesis client.

Turning to FIG. 5, a flow diagram is provided that illustrates a method 500 for providing speech synthesis using a code-mixed speech engine in a speech synthesis system. At block 502, code-mixed training data associated with a plurality of different languages is accessed. At block 504, training phase operations comprising orthogonal-loss-based training are executed. At block 506, a code-mixed speech model associated with generating instances of code-mixed synthesized speech is generated. At block 508, the code-mixed speech model is deployed to support generating the instances of code-mixed synthesized speech. At block 510, interface phase operations comprising dynamic updating a reference speaker and language ID based on a phone ID is executed using the code-mixed speech model and an inference engine. At block 512, an instance of code-mixed synthesized speech associated with the code-mixed speech model is generated.

Technical Improvement

Embodiments of the present technical solution have been described with reference to several inventive features (e.g., operations, systems, engines, and components) associated with a speech synthesis system. Inventive features described include: operations, interfaces, data structures, and arrangements of computing resources associated with providing the functionality described herein relative with reference to a code-mixed speech engine. Functionality of the embodiments of the present technical solution have further been described, by way of an implementation and anecdotal examples—to demonstrate that the operations (e.g., generating a code-mixed speech model and generating instances of code-mixed synthesized speech based on the code-mixed speech model and an inference engine) for providing the code-mixed speech engine. The code-mixed speech engine is as a solution to a specific problem (e.g., limitations in generating comprehensive code-mixed synthesized speech) in speech synthesis technology. The code-mixed speech engine improves computing operations associated with speech model generation and providing code-mixed synthesized speech in speech synthesis systems. Overall, these improvements result in less CPU computation, smaller memory requirements, and increased flexibility in speech synthesis systems when compared to previous conventional speech synthesis system operations performed for similar functionality.

Additional Support for Detailed Description

Example Distributed Computing System Environment

Figure 6:
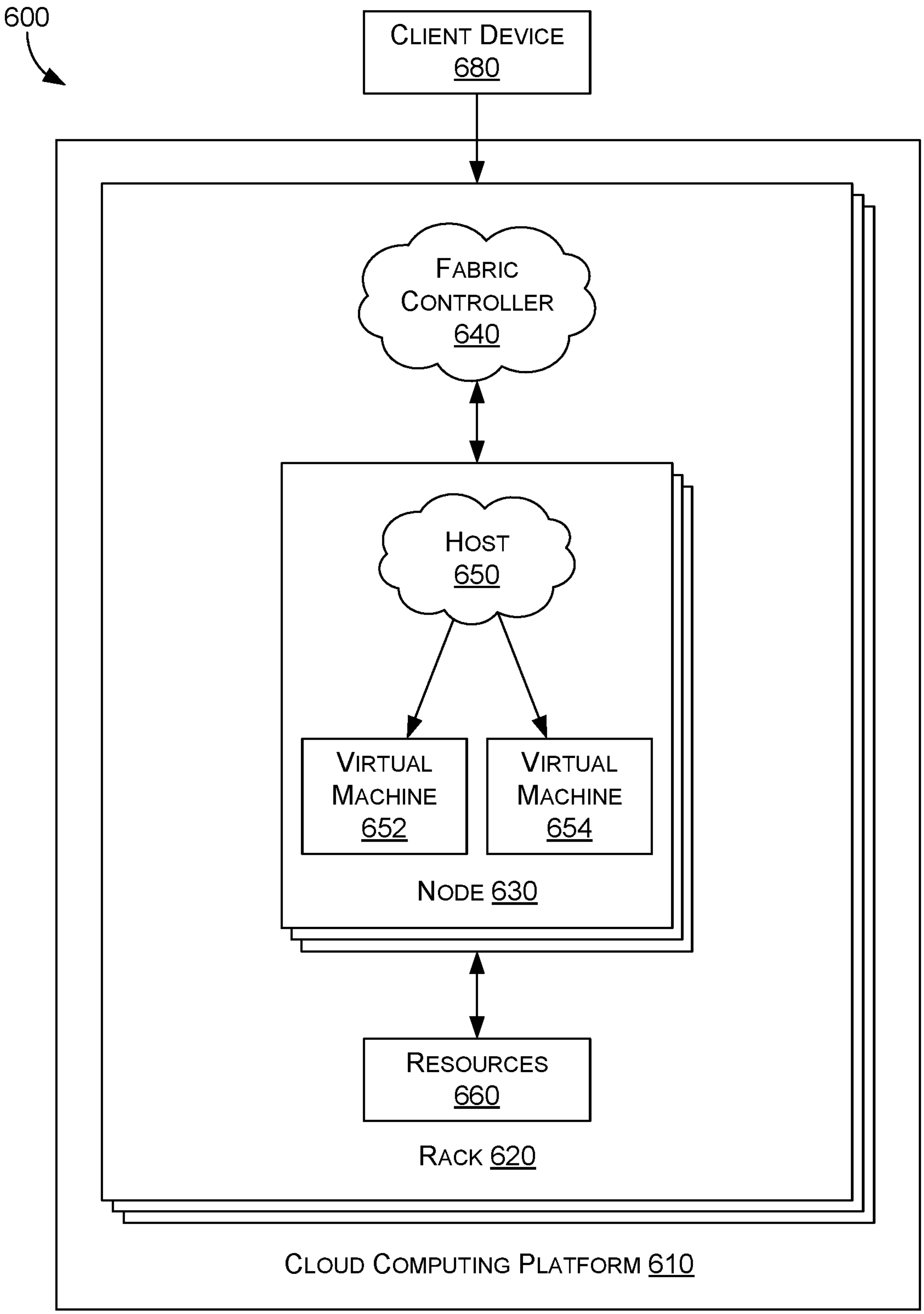
FIG. 6 provides a block diagram of an exemplary distributed computing environment suitable for use in implementing aspects of the technology described herein.

Referring now to FIG. 6, FIG. 6 illustrates an example distributed computing environment 600 in which implementations of the present disclosure may be employed. In particular, FIG. 6 shows a high level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement fabric controller 640 component for provisioning and managing resource allocation, deployment, upgrade, and management of cloud services. Typically, cloud computing platform 610 acts to store data or run service applications in a distributed manner. Cloud computing infrastructure 610 in a data center can be configured to host and support operation of endpoints of a particular service application. Cloud computing infrastructure 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant can refer to a customer utilizing resources of cloud computing platform 610. Service application components of cloud computing platform 610 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610. It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in cloud computing platform 610. Client device 680 may be any type of computing device, which may correspond to computing device 600 described with reference to FIG. 6, for example, client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs).

Example Computing Environment

Having briefly described an overview of embodiments of the present technical solution, an example operating environment in which embodiments of the present technical solution may be implemented is described below in order to provide a general context for various aspects of the present technical solution. Referring initially to FIG. 6 in particular, an example operating environment for implementing embodiments of the present technical solution is shown and designated generally as computing device 600. Computing device 600 is but one example of a suitable computing environment and is not intended to suggest any limitation as to the scope of use or functionality of the technical solution. Neither should computing device 700 be interpreted as having any dependency or requirement relating to any one or combination of components illustrated.

The technical solution may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technical solution may be practiced in a variety of system configurations, including hand-held devices, consumer electronics, general-purpose computers, more specialty computing devices, etc. The technical solution may also be practiced in distributed computing environments where tasks are performed by remote-processing devices that are linked through a communications network.

Figure 7:
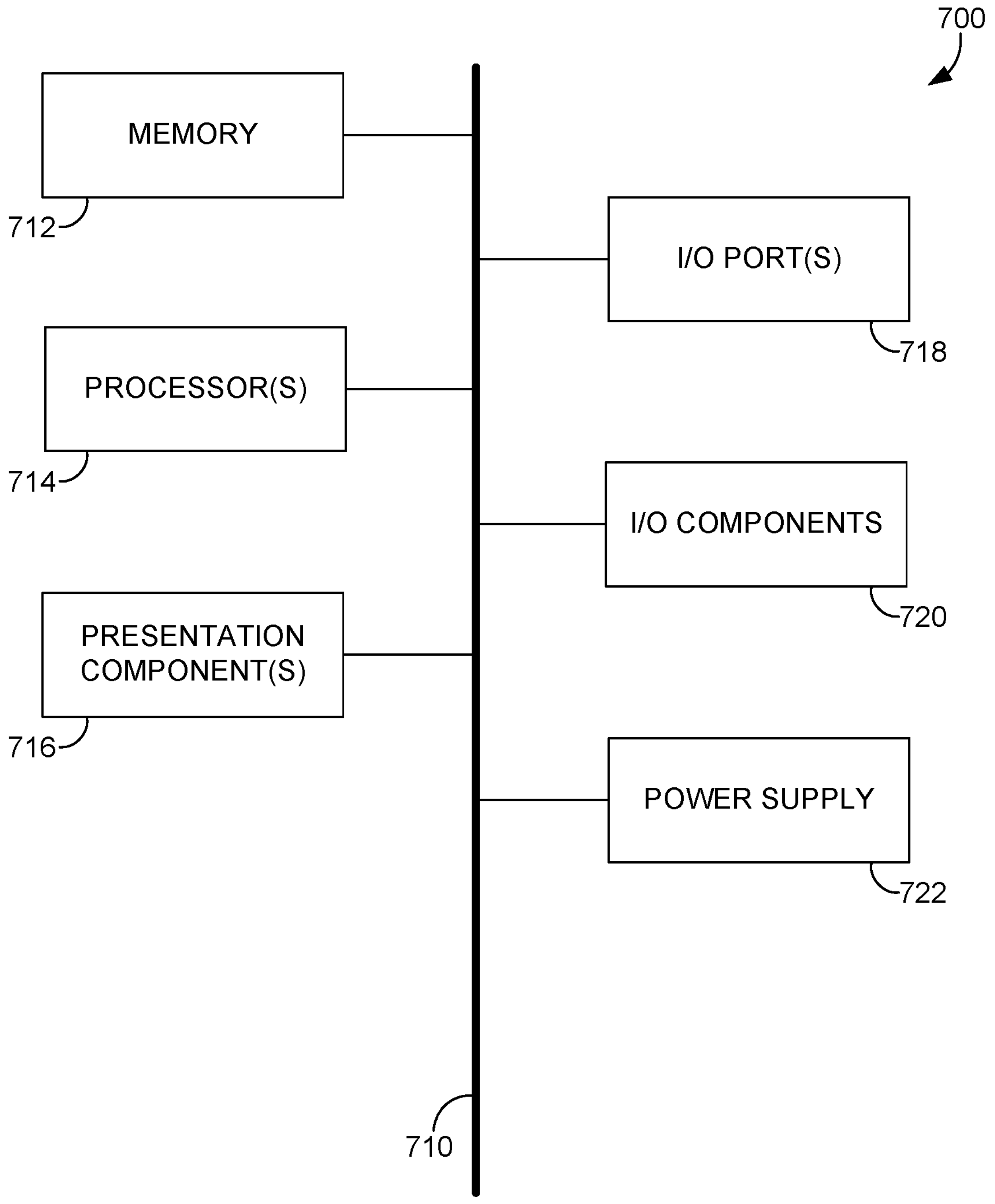
FIG. 7 is a block diagram of an exemplary computing environment suitable for use in implementing aspects of the technology described herein.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with line s for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present technical solution. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the technical solution is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technical solution are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present technical solution may generally refer to the technical solution environment and the schematics described herein, it is understood that the techniques described may be extended to other implementation contexts.

Embodiments of the present technical solution have been described in relation to particular embodiments which are intended in all respects to be illustrative rather than restrictive. Alternative embodiments will become apparent to those of ordinary skill in the art to which the present technical solution pertains without departing from its scope.

From the foregoing, it will be seen that this technical solution is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:

one or more computer processors; and computer memory storing computer-useable instructions that, when used by the one or more computer processors, cause the one or more computer processors to perform operations, the operations comprising:

accessing code-mixed training data associated with a plurality of different languages;

based on the code-mixed training data, generating a code-mixed speech model associated with a training engine and an inference engine that support generating code-mixed synthesized speech, wherein the code-mixed speech model is trained using an orthogonal loss training constraint that separates speaker embeddings and language embeddings to reduce accent leakage;

deploying the code-mixed speech model;

receiving a request for synthesized speech, the request being associated with code-mixed input of a speech synthesis client;

using the code-mixed speech model and the inference engine, generating an instance of code-mixed synthesized speech in a single target speaker voice across two or more languages; and communicating the instance of the code-mixed synthesized speech associated with the single target speaker voice for output on an interface associated with the speech synthesis client.

2. The system of claim 1, wherein the code-mixed speech model comprises a multilingual speech model generated based on training the code-mixed speech model using the code-mixed training data associated with a two or more languages and two or more scripts, wherein training the code-mixed speech model is based at least in part on speaker embeddings and language embeddings identified in the code-mixed training data.

3. The system of claim 1, wherein the training engine supports an orthogonal loss training constraint, the orthogonal loss training constraint comprises disentangled speaker embeddings and language embeddings in training the code-mixed speech model to reduce accent leak of a target speaker.

4. The system of claim 1, wherein the code-mixed speech model is deployed to support generating inferences using the inference engine, wherein the code-mixed speech model is accessible at the speech synthesis client via an Application Programming Interface (API).

5. The system of claim 1, wherein the speech synthesis client comprises the interface that supports receiving the request and outputting the instance of code-mixed synthesized speech, wherein the request comprises the code-mixed input including input text in two or more languages and the instance of the code-mixed synthesized speech is associated with output text in two or more languages.

6. The system of claim 1, wherein the inference engine supports selecting a locale identifier and prosody features of a target speaker; and executing duration scaling based on phones identified in the code-mixed input request.

7. The system of claim 1, wherein generating the code-mixed synthesized speech further comprises:

using a language identification model to segment text of the code-mixed input into a first text of a first language and a second text of a second language;

selecting a first language module for the first text of the first language;

selecting a second language module for the second text of the second language;

using the first language module and the second language module, generating a code-mixed phone sequence comprising a plurality of phones associated with the first text and the second text, wherein each code-mixed phone is associated with a phone identifier; and generating the code-mixed synthesized speech based on changing a reference speaker and language identifier based on a corresponding phone identifier.

8. The system of claim 7, wherein the reference speaker and the language identifier are associated with a plurality of prosody features that are employed for a target speaker's voice associated with the code-mixed synthesized speech.

9. The system of claim 1, the operations further comprising:

communicating, from the speech synthesis client, the request for the code-mixed synthesized speech;

based on the request, receiving the code-mixed synthesized speech; and causing output of the code-mixed synthesized speech on the interface.

10. The system of claim 1, the operations further comprising:

receiving, from the speech synthesis client, an indication to update to a new target speaker;

communicating a second request for a second instance of code-mixed synthesized speech;

based on the second request, receiving the second instance of code-mixed synthesized speech generated based on the new target speaker, wherein the second instance of code-mixed synthesized speech is different from the instance of code-mixed synthesized speech and generated based on the new target speaker; and causing output of the second code-mixed synthesized speech on the interface.

11. One or more computer-storage media having computer-executable instructions embodied thereon that, when executed by a computing system having a processor and memory, cause the processor to perform operations, the operations comprising:

communicating a request for synthesized speech, the request being associated with code-mixed input of a speech synthesis client;

based on the request, receiving an instance of code-mixed synthesized speech in a single target speaker voice across two or more languages, the code-mixed synthesized speech is generated using a code-mixed speech model that is associated with a training engine and an inference engine that support generating code-mixed synthesized speech, wherein the code-mixed speech model is trained using an orthogonal loss training constraint that separates speaker embeddings and language embeddings to reduce accent leakage; and causing output of the instance of code-mixed synthesized speech associated with the single target speaker voice via an interface associated with the speech synthesis client.

12. The media of claim 11, wherein the speech synthesis client comprises the interface that supports receiving the request and outputting the instance of code-mixed synthesized speech, wherein the request comprises the code-mixed input comprises input text in two or more languages and the instance of the code-mixed synthesized speech is associated with output text in two or more languages.

13. The media of claim 11, wherein the training engine supports an orthogonal loss training constraint, the orthogonal loss training constraint comprises disentangled speaker embeddings and language embeddings in training the code-mixed speech model to reduce accent leak of a target speaker.

14. The media of claim 11, wherein the inference engine supports selecting a locale identifier and prosody features of a target speaker; and executing duration scaling based on phones identified in the code-mixed input request.

15. The media of claim 11, the operations further comprising:

receiving, from the speech synthesis client, an indication to update to a new target speaker;

communicating a second request for a second instance of code-mixed synthesized speech;

based on the second request, receiving the second instance of code-mixed synthesized speech generated based on the new target speaker, wherein the second instance of code-mixed synthesized speech is different from the instance of code-mixed synthesized speech and generated based on the new target speaker; and causing output of the second code-mixed synthesized speech on the interface.

16. A computer-implemented method, the method comprising:

accessing code-mixed training data associated with a plurality of different languages;

based on the code-mixed training data, generating a code-mixed speech model associated with a training engine and an inference engine that support generating code-mixed synthesized speech in a single target speaker voice across two or more languages, wherein the code-mixed speech model is trained using an orthogonal loss training constraint that separates speaker embeddings and language embeddings to reduce accent leakage; and deploying the code-mixed speech model to cause generation of an instance of code-mixed synthesized speech in a single target speaker voice across two or more languages using the code-mixed speech model and the inference engine, generating.

17. The method of claim 16, wherein the training engine supports an orthogonal loss training constraint, the orthogonal loss training constraint comprises disentangled speaker embeddings and language embedding in training the code-mixed speech model to reduce accent leak of a target speaker.

18. The method of claim 16, wherein the inference engine supports selecting a locale identifier and prosody features of a target speaker; and executing duration scaling based on a phone code-mixed input requests.

19. The method of claim 16, the method further comprising:

receiving a request for synthesized speech, the request being associated with code-mixed input of a speech synthesis client;

using the code-mixed speech model and the inference engine, generating an instance of code-mixed synthesized speech; and communicating the instance of the code-mixed synthesized speech for output on an interface associated with the speech synthesis client.

20. The method of claim 19, the method further comprising:

receiving an indication to update to a new target speaker;

receiving a second request for a second instance of code-mixed synthesized speech;

using the code-mixed speech model and the inference engine, generating a second instance of code-mixed synthesized speech associated with the new target speaker; and communicating the second instance code-mixed synthesized speech for output on an interface associated with the speech synthesis client.

* * * * *